United States Patent
Sun et al.

(10) Patent No.: US 9,936,330 B2
(45) Date of Patent: Apr. 3, 2018

(54) METHODS FOR EXCHANGING DATA AMONGST MOBILE APPLICATIONS USING SUPERLINKS

(71) Applicants: Lei Sun, Pleasanton, CA (US); Li Hong, Richmond, CA (US); Han Cheng Liang, Albany, CA (US)

(72) Inventors: Lei Sun, Pleasanton, CA (US); Li Hong, Richmond, CA (US); Han Cheng Liang, Albany, CA (US)

(73) Assignee: YOZIO INC., Pleasanton, CA (US)

( * ) Notice: Subject to any disclaimer, the term of this patent is extended or adjusted under 35 U.S.C. 154(b) by 539 days.

(21) Appl. No.: 14/532,754

(22) Filed: Nov. 4, 2014

(65) Prior Publication Data

US 2015/0215383 A1    Jul. 30, 2015

Related U.S. Application Data

(60) Provisional application No. 61/933,501, filed on Jan. 30, 2014, provisional application No. 62/048,624, filed on Sep. 10, 2014.

(51) Int. Cl.
*H04W 4/00* (2009.01)
*G06F 17/30* (2006.01)
*H04L 29/08* (2006.01)

(52) U.S. Cl.
CPC ......... *H04W 4/00* (2013.01); *G06F 17/3089* (2013.01); *G06F 17/30876* (2013.01); *H04L 67/02* (2013.01); *H04L 67/10* (2013.01); *H04L 67/22* (2013.01)

(58) Field of Classification Search
CPC ........... G06F 17/3089; G06F 17/30876; H04L 67/02; H04L 67/10; H04L 67/22; H04W 4/00

See application file for complete search history.

(56) References Cited

U.S. PATENT DOCUMENTS

| | | | | |
|---|---|---|---|---|
| 2001/0047426 A1* | 11/2001 | Hunter | ................ | G06F 17/3089 709/238 |
| 2001/0047428 A1* | 11/2001 | Hunter | ................ | G06F 17/3089 709/245 |
| 2004/0236847 A1* | 11/2004 | Roy | ................. | H04L 29/06027 709/223 |
| 2014/0129733 A1* | 5/2014 | Klais | .................... | H04L 67/327 709/239 |

FOREIGN PATENT DOCUMENTS

EP       2442532 A1 *    4/2012    ............ H04W 4/003

\* cited by examiner

*Primary Examiner* — Michael C Lai
(74) *Attorney, Agent, or Firm* — Womble Bond Dickinson (US) LLP

(57) ABSTRACT

In one embodiment, a server receives a first URL link from a first mobile device of a first user. In response to the first URL link, the server determines whether a first mobile application that is associated with the URL link has been installed at the first mobile device. If the first mobile application has not been installed at the first mobile device, interactive data of the first user with respect to the first URL link is collected and stored in an event database of the server. If the first mobile application has been installed at the first mobile device, first data that is associated with the first URL link is retrieved from the link database and a second URL link is generated, the second URL link including the first data embedded therein. The second URL link is transmitted to the first mobile device.

19 Claims, 13 Drawing Sheets

300

| Superlink ID/Key | Name/Description | Data | Destination URL | Other Information (e.g., App Type) |
|---|---|---|---|---|
| Http://r.yoz.io/a.b.c | eBay $50 off iPad | "discount":"$50-off iPad", "show-item-#":"12345" | Http://ebay.com | eBay App |
| 301 | 302 | 303 | 304 | 305 |
| ... | ... | ... | ... | ... |

FIG. 3

| Event ID/Key | IP Addr | HTTP header | User Agent | Cookies | Others |
|---|---|---|---|---|---|
| ... | ... | ... | ... | ... | ... |

FIG. 5

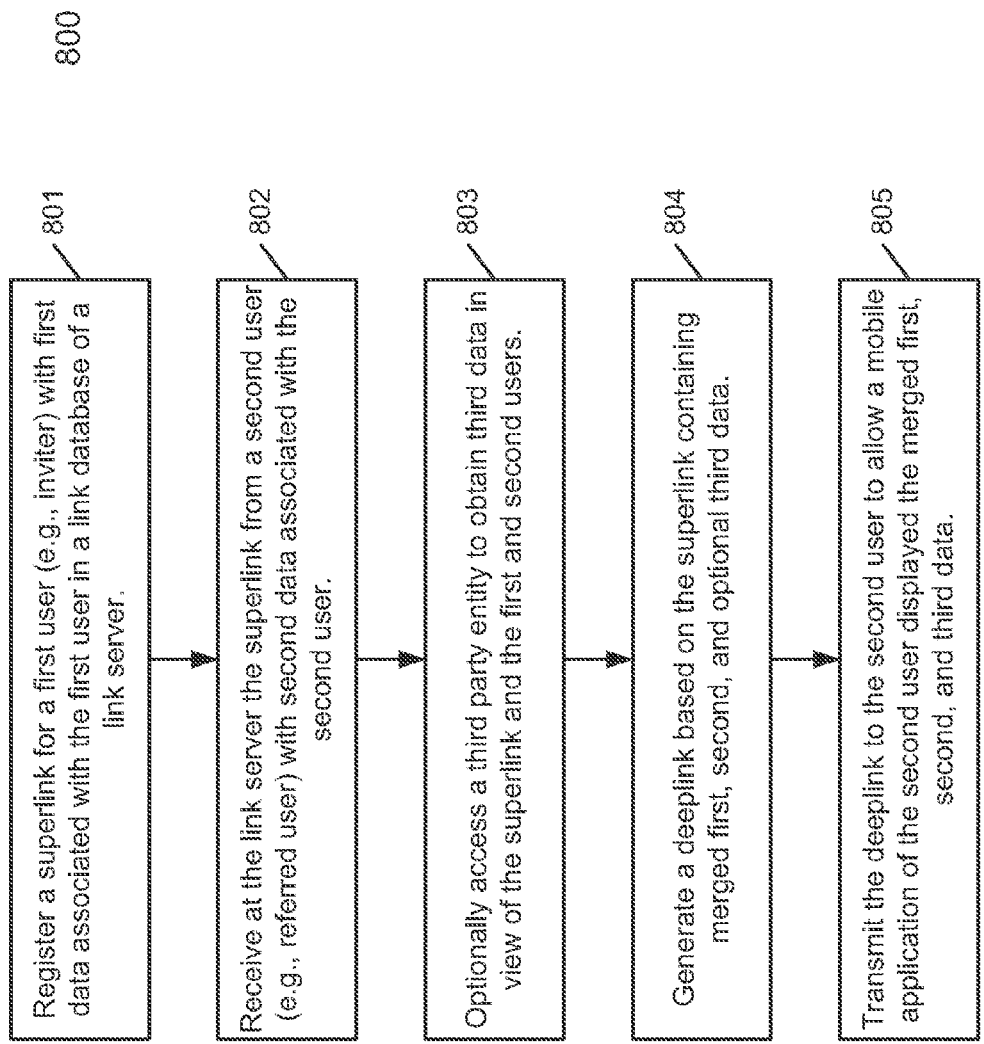

METHODS FOR EXCHANGING DATA AMONGST MOBILE APPLICATIONS USING SUPERLINKS

RELATED APPLICATIONS

This application claims the benefit of U.S. Provisional Patent Application No. 61/933,501, filed Jan. 30, 2014 and U.S. Provisional Patent Application No. 62/048,624, filed Sep. 10, 2014, the disclosure of which is incorporated by reference herein by its entirety.

FIELD OF THE INVENTION

Embodiments of the present invention relate generally to mobile computing. More particularly, embodiments of the invention relate to methods for exchanging data amongst mobile applications using superlinks.

BACKGROUND

Hyperlinks and deeplinks have been increasingly utilized in Web-based computing. Both hyperlinks and deeplinks have to store the data as a part of the link in the form of http parameters or as a part of the universal resource locator (URL). It usually results in a very long and none-human friendly way, and could expose information that the application does not want to display to the end user due to privacy, security or brand impression reasons. Such as user credit card number, phone number, marketing campaign targeting criteria, etc.

In the web context, the destination page of the hyperlink can receive data in the form of hypertext transport protocol (HTTP) parameters. In the application context, hyperlink cannot pass data from the link to an application. If the end user does not have the destination application installed on his/her device, he/she has to click on a link to the browser application or a store application on the device, and download the application. However, when the user launches the application for the first time after the download, there is no way for the application to get any prior information about which link the end user has clicked on, and there is no way for the link to pass any data to the application.

Deeplink cannot pass data to the destination application if the destination application is not installed on the device. Deeplink allows an application to pass data to other applications. However, in order to pass the data from the originator application to the destination application via the deeplink, it requires the destination application to be installed on the device. If the destination application has not been yet installed on the device, the mobile operating system will either do nothing, or return an error message. Since the deeplink URL or the data on the deeplink is not stored anywhere, if the destination application has not been installed at the time when the link was clicked/triggered, these data will be lost, and never passed to the destination application, even after the destination application has been installed later.

Hyperlink or deeplink's URL have to be changed if the data it is passing needs to be changed. For hyperlink or deeplink, once the link has been constructed, if one wants to alter the data the link is passing, one has to make changes to the parameters on the link. This is very cumbersome. For example, if you have sent the generated a hyperlink or deeplink via email to the end users, and later discovered this link has the wrong discount coupon code, and none of the link recipient will be able to redeem it. You cannot take that email back, and the end users run into issues.

BRIEF DESCRIPTION OF THE DRAWINGS

Embodiments of the invention are illustrated by way of example and not limitation in the figures of the accompanying drawings in which like references indicate similar elements.

FIG. 3 is a block diagram illustrating a data structure representing a link database according to one embodiment of the invention.

FIG. 5 is a block diagram illustrating a data structure representing a device/event database according to one embodiment of the invention.

FIG. 8 is a flow diagram illustrating a process for exchanging information using superlinks according to another embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a link server is utilized to maintain a short URL link (also referred to as a superlink)

associated with a long URL link (e.g., deeplink) with data intended to be passed via the long URL link. With the link server, it can extend the normal hyperlink and deeplink capability to allow links store and pass data from a source application (e.g., mobile browser or email client application) to a destination application (e.g., eBay® mobile application for eBay.com) on the same mobile device, even if the destination application has not been installed. In one embodiment, the data to be passed between two applications can be stored on the link server (also referred to as a superlink server) temporarily, until the destination application has been installed on the mobile device. The data is then passed, for example, embedded within the long URL link that is dynamically generated based on an activation of the associated short URL link, to the destination application to be processed or displayed therein.

According to another embodiment, in addition to pass the regular data via a superlink, the link server invokes a statistics system or model to perform a statistics operation to determine a likelihood that a first user who downloads a particular application and a second user who clicks on a superlink is the same user. The statistics model or system may be created and operating based on prior user interactions, which may be collected by the link server or a third party data collection system. As a result a mobile application provider can target different types of users more accurately and efficiently.

Figure 1:
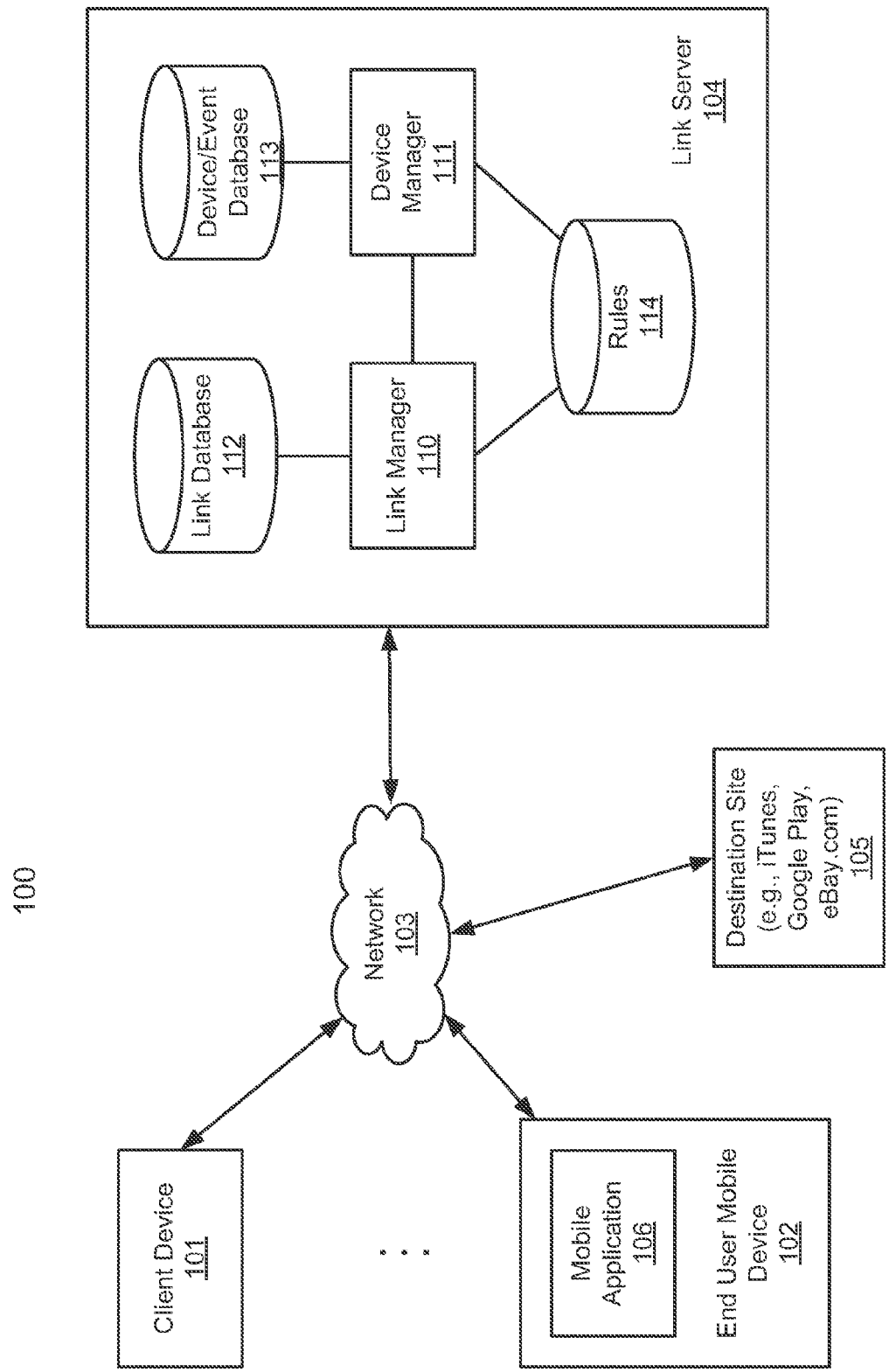
FIG. 1 is a block diagram illustrating a superlink system according to one embodiment of the invention.

FIG. 1 is a block diagram illustrating a superlink system according to one embodiment of the invention. Referring to FIG. 1, system 100 includes, but is not limited to, one or more clients 101-102 communicatively coupled to link server 104 over a network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as the Internet, or a combination thereof, wired or wireless. Server 104 may be any kind of servers, such as a Web server or a cluster of servers in the cloud.

In one embodiment, server 104 maintains a link database 112 to store superlinks and their corresponding destination URL links, as well as the data associated with the destination URL links. The superlinks stored in link database 112 are managed by link manager 110, which may be processing logic in software, hardware, or a combination of both. A superlink may be created by any user, herein referred to as a superlink owner, via a user interface (not shown), such as a Web interface, API, a command line interface (CLI), etc. For example, client 101 as a superlink owner can communicate with link server 104 by providing a destination URL link and the data, and in return obtains the superlink from link server 104. The superlink may be associated with a destination site 105 (e.g., eBay). The superlink can subsequently sent to another user, in this example, client 102 to be utilized by mobile application 106 running therein. When a user of client 102 activates the received superlink, the superlink will direct mobile device 102 to link server 104 to retrieve the destination URL link and the associated data to be processed by the destination mobile application (e.g., eBay mobile application).

With the link server 104, it can extend the normal hyperlink and deeplink capability to allow links store and pass data from a source application (e.g., mobile browser or email client application) to a destination application (e.g., eBay® mobile application for eBay.com) on the same mobile device (e.g., mobile device 102), even if the destination application has not been installed. In one embodiment, the data to be passed between two applications can be stored in link database 112 on the link server 104, until the destination application has been installed on the mobile device 102, for example, from destination site 105. The data is then passed, for example, embedded within the long URL link that is dynamically generated based on an activation of the associated short URL link, to the destination application to be processed or displayed therein.

In addition, according to one embodiment, the link server 104 maintains a device/event database 113 to record and store certain information concerning interactive information of the superlink, such as, for example, device information when the superlink was clicked, the source application that activated the superlink, whether the destination application has been installed on the device, the general context, and an interface to dynamically modify the data to be passed for each click of the superlink. Thus, it enables the destination application to respond differently to different end users and their prior activations of the superlinks, and provides a better user experience. Note that databases 112-113 may be implemented as a single database or separate databases, locally, remotely, or both.

In one embodiment, the link server 104 allows applications (e.g., client 101) to save all of these data on the link server 104, and only expose a short URL (e.g., superlink) to an end user (e.g., client 102). Thus, making the URL easier to type, use, and not exposing the data to the end user. After the end user has clicked on the short URL link, and opened the associated application (e.g., mobile application 106), these data can then be retrieved from the link server 104, which can be used to provide better tracking, end user experience, or other purposes. A superlink provides a much more consistent and universal support to pass data from the superlink to an application. A superlink also allows a mobile application to pass data to another mobile application, whether the destination mobile application is installed or not at the time of the activation of the superlink. The configuration of a superlink in conjunction with the link server 104 allows a superlink owner or administrator to modify the data associated with these superlink dynamically, for example, via a Web interface or application programming interface (API) of the link server 104, so that they can modify or correct errors even after the superlink has been distributed to the public, in this example, client 102.

In another embodiment, a superlink allows its users to dynamically append additional data in the form of URL parameters, and save these new data into event database 113 on the link server 104 when the superlink was activated. At a later time, when the data is requested about this click event, device manager 111 of link server 104 will locate the click record and the data saved in database 113 associated with this click event from the URL parameters, then merge and override these data with the original link data, and return merged data to the downstream application (e.g., mobile application 106). Thus, allowing downstream application to personalize the user experience for every activation of the superlink.

According to a further embodiment, upon an activation of a superlink from a source application (e.g., browser application or email client application), the source application accesses the link server 104 via the superlink using HTTP protocols. In response, link manager 110 of link server 104 extracts a variety of information from the HTTP request header from the current interaction of the superlink and previous interaction information (which may also be stored in device/event database 113) from the link server 104. The extracted information may include user-agent, device type, device hardware, operating system, operating system version, system language, system locale, source app, source application version, time of the day, day of the week, IP address, internet network in which the end user resides, if the user is connecting through a normal wireless or the current device's mobile carrier, geographical location of this user, number of times the superlink has been activated by the same device and/or user, if the destination application been previously installed, timestamp of the previous clicks, all the devices that has clicked in the link, and the geographic relationship of those clicks and devices, etc. A superlink owner can also specify additional contextual info in the form of data parameters, such as gender, age, referring code, promotion code, friend info, etc.

A superlink user can take the advantage of this contextual awareness and set up rules 114 or automated learning system to override or adjust the rules or data to be passed to the downstream application based on the context of each activity. A superlink allows its user to dynamically change/override the data being passed downstream application based on the click context and a set of rules and conditions 114. Therefore, each click on the link could result in very different downstream user experience in the destination application. A superlink allows its user to integrate a third-party system or automated self learning systems (not shown) to periodically change/override the rules via API, so the third-party system or the automated self learning systems can optimize the downstream application's user experience without user intervention. Similarly, a superlink allows its user to integrate third-party system or automated self learning systems, and makes all of the contextual information available to such system, and allows such system to dynamically change/override the data being passed to the downstream application for every click on the link in real time, which would improve the personalization efficiency even further.

Figure 2:
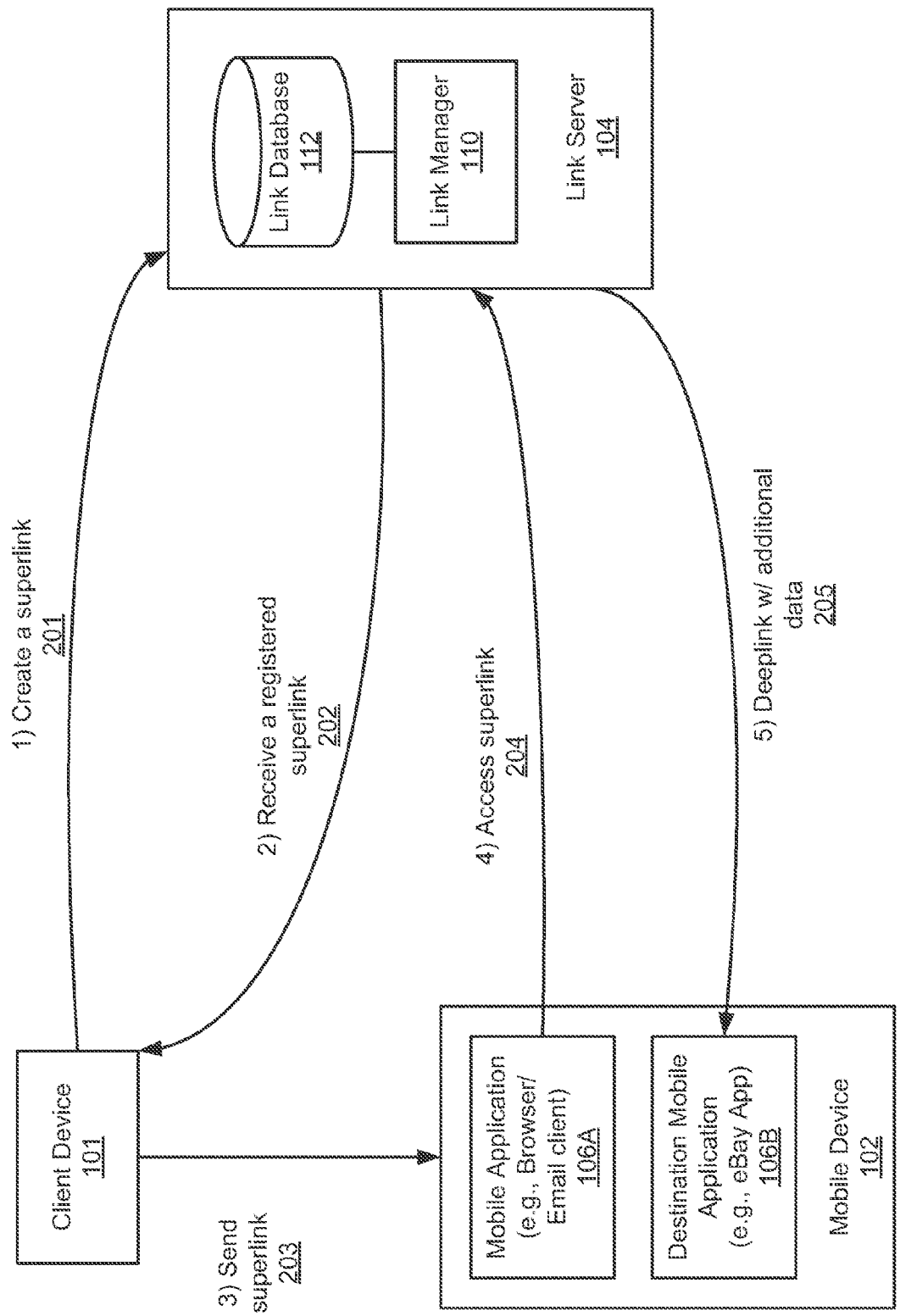
FIG. 2 is a transactional diagram illustrating transactions between a client and a link server according to one embodiment of the invention.

FIG. 2 is a transactional diagram illustrating transactions between a client and a link server according to one embodiment of the invention. In one embodiment, a superlink owner, in this example, client 101, communicates via path 201 with link manager 110 of server 104 to create a superlink, for example, by providing via Web interface of server 104 at least a destination URL link (e.g., long URL link) and the data intended to be passed along with the destination URL link. In response to the request for creating a superlink, in one embodiment, link manager 110 generate a unique superlink to be associated with the destination URL link and the corresponding data, where the superlink is shorter than the destination URL link and without including the data intended to be passed via the destination URL link. The newly created superlink, the destination URL link, the associated data, and possible other information associated with the superlink, are then stored in a database entry of link database 112. An example of link database 112 is shown in FIG. 3. The link database 112 may be indexed or sorted based on the superlinks (also referred to as superlink identifiers or IDs). The superlink is then returned to the superlink owner, client 101, via path 202.

In this configuration, the superlink owner, client 101, can subsequently send the super link to one or more its clients, such as, for example, client 102 via path 203. For the purposes of illustration, it is assumed that the superlink is emailed from client 101 to client 102 and received by mobile application 106A as an email client application. When a user activates the superlink from application 106A, for example, by clicking on the superlink, the superlink causes the application 106A to access link server 104 to access data associated with the superlink. In this example, if the application 106A is an email client application, it may launch a browser application to access the superlink, where the browser application is referred to as a source application. Alternatively, a user can simply type the superlink in an address field of a browser application, since the superlink has been designed to be short and user friendly (e.g., easier to memorize). This can be accomplished using a variety of communication protocols, such as, for example, an HTTP compatible protocol.

Based on the information extracted from the superlink, link manager 110 looks up in link database 112 based on the superlink to identify the registered destination link and its associated data. Link manager 110 dynamically generates a deeplink based on the destination URL link and the associated data retrieved from link database. Referring now to FIGS. 2 and 3, where link database 300 may represent database 112 of FIG. 2, according to one embodiment, link manager 110 looks up in link database 300 based on the superlink by matching the superlink against those listed in field 301 to locate an entry that has a matched superlink. From the located entry, the associated data and the destination URL link can be obtained from fields 303 and 304. The deeplink is then generated based on the retrieved destination URL link and the data. The deeplink is then returned via path 205 to mobile device 102 and received by destination mobile application 106B to access the deeplink, including processing or displaying the data carried by the deeplink at mobile device 102. As a result, the user of mobile device 102 does not need to memorize the relatively long deeplink and the data carried by the deeplink is not exposed or visible to the user.

For example, a superlink owner can create a link with name "eBay $50 off iPad", and data {"discount":"$50-off ipad", "show-item-#":"12345"}, and destination URL(s) http://ebay.com, and associate with eBay mobile App. The server 104 will create a record to store in link database 112 the link name and data, then return a short URL looks like http://r.yoz.io/a.b.c. A superlink user, for example, can be an eBay developer integrates a software development kit (SDK) associated with server 104 or a server API directly into their mobile application or Web application, and distribute the mobile application to an application store such as iTunes or Google Play, or deploy the Web application to http://www.ebay.com. An eBay marketing manager can create a superlink [http://r.yoz.io/a.b.c] for eBay mobile application with data: {"discount":"$50-off ipad", "show-item-#":"12345"}, Data Stored destination URL: http://ebay.com., eBay Deeplink base URL to redirect to: "ebay://yozio-data-passthrough/?". The eBay marketing manager then distributes this link [http://r.yoz.io/a.b.c] on eBay website or send to eBay buyers via email/SMS/other marketing channels. An eBay user (buyer or seller) receives the superlink and clicks on it, which in turn access link server 104.

If the user device of the user is not a mobile device, according to one embodiment, the link server 104 can detect that via an HTTP request header, and redirect it to the normal eBay website with a unique token, and the eBay web server can then use this unique token to access link server 104 to obtain the data {"discount":"$50-off ipad", "show-item-#": "12345"} from link server 104. Otherwise, the data will be transmitted to the destination application to be processed or displayed at the mobile device.

The above superlink techniques can be applied even to situations where the destination mobile application has not been installed at the mobile device. In this scenario, the interactive information can be buffered in the link server, until the destination mobile application has been installed. As a result, the data to be passed to the destination mobile application would not be lost if the destination mobile application has not been installed or activated.

Figure 4:
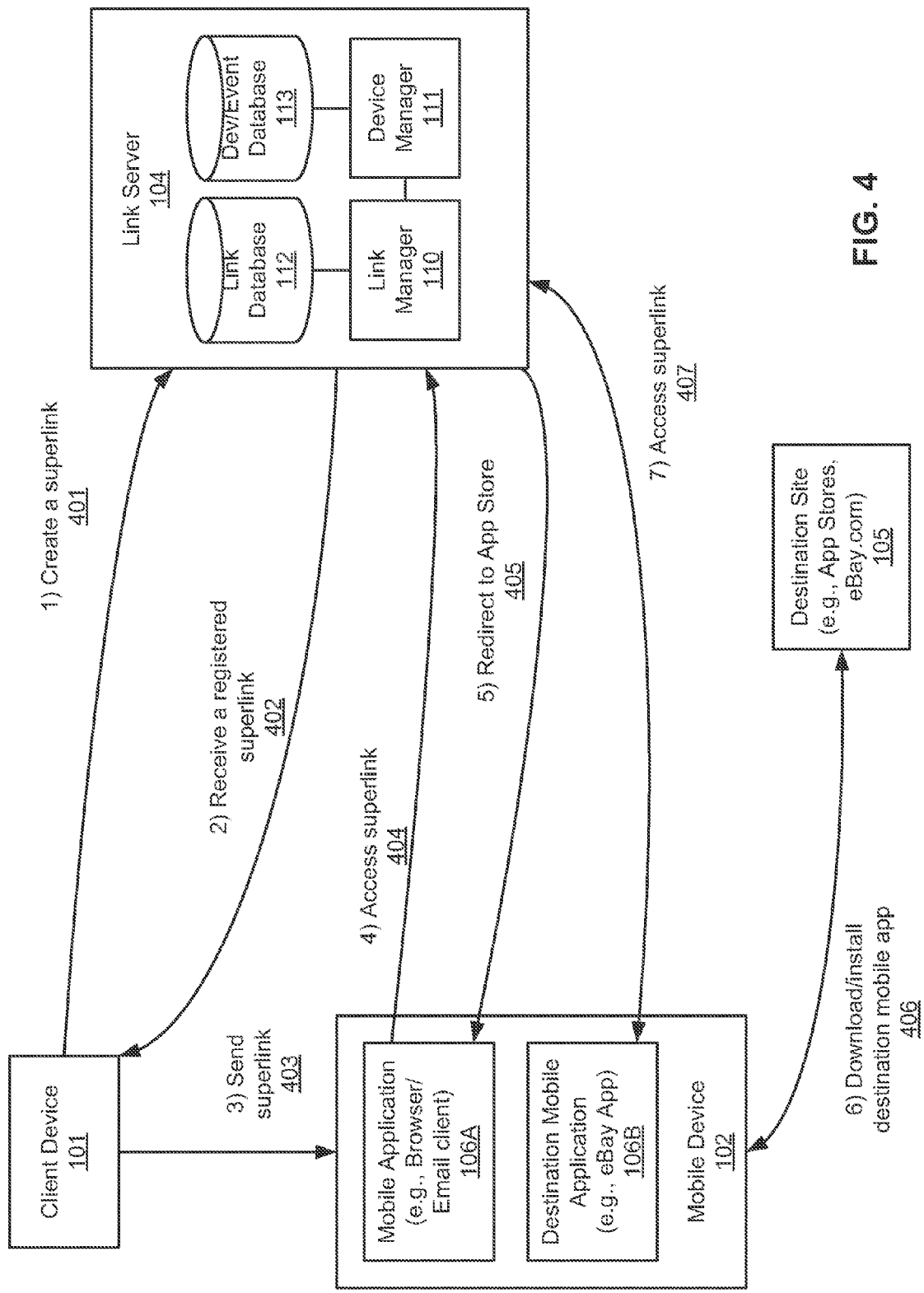
FIG. 4 is a transactional diagram illustrating transactions between a client and a link server according to another embodiment of the invention.

FIG. 4 is a transactional diagram illustrating transactions between a client and a link server according to another embodiment of the invention. Referring to FIG. 4, similar to the transactions as shown in FIG. 2, client 101, as a superlink owner, can access link server 104 via path 401 to request a superlink to be created by providing the necessary information such as destination URL and associated data to be passed. In response to a superlink via path 402 from link server 104, client 101 can subsequently send the superlink via path 403 to another user, client 102. When a user of client 102 clicks on the received superlink, the superlink causes mobile application 106A (e.g., browser application) as a source application to access the superlink via path 404.

In response to the request for accessing the superlink received via path 404, link manager 110 determines whether a destination mobile application associated with the superlink has been installed or activated at mobile device 102. In one embodiment, link manager 110 looks up in link database 112 to locate a database entry based on the received superlink to determine a destination mobile application that is associated with the superlink, for example, based on field 305 of FIG. 3, which indicates a type of mobile application that is associated with the corresponding superlink. Link manager 110 then communicates with source application 106A to determine whether the destination mobile application, in this example, 106B, has been installed at mobile device 102. In one embodiment, link manager 110 may transmit a Java script to mobile device 102 to be executed by source application 106A to determine whether destination application 106B has been installed.

In addition, device manager 111 is invoked to capture any information associated with mobile device 102 and/or the user operating mobile device 102, and to store the captured information in device/event database 113. For example, link manager 110 extracts a variety of information from the HTTP request header from the current interaction of the superlink. The extracted information may include user-agent, device type, device hardware, operating system, operating system version, system language, system locale, source app, source application version, time of the day, day of the week, IP address, internet network in which the end user resides, if the user is connecting through a normal wireless or the current device's mobile carrier, geographical location of this user, number of times the superlink has been activated by the same device and/or user, if the destination application been previously installed, timestamp of the previous clicks, all the devices that has clicked in the link, and the geographic relationship of those clicks and devices, etc. A superlink owner can also specify additional contextual info in the form of data parameters, such as gender, age, referring code, promotion code, friend info, etc. An example of device/event database 113 is shown in FIG. 5 for the illustration purpose only.

If it is determined the destination mobile application has not been installed, link manager 110 redirects via path 405 source application 106A to a destination site 105 such as a Web site or application store (which may be determined from link database 111) to allow mobile device 102 to install via path 406 the destination mobile application 106B from destination site 105. Once destination mobile application 106B has been installed and launched, it communicates with link server 104 to retrieve and access the previously buffered superlink via path 407.

For example, continuing with the above example, it is assumed that a superlink http://r.yoz.io/a.b.c that is associated with eBay mobile application has been created. In this superlink, it has been attached with data {"discount":"$50-off-ipad", "show-item-#":"12345"}, and if the eBay mobile application has not been installed, the user may be redirected to the destination URL, in this example, http://ebay.com, which has a normal hyperlink on that Web page that would allow the user to download the eBay application from the associated application store. If the destination application has been installed, it will redirect to the destination application through a dynamically generated deeplink, which carries all of the data stored on the server for this superlink. The application receives all the data from this dynamically generated deeplink.

Continue from the example above, when an end user clicked on the superlink http://r.yoz.io/a.b.c, this link will detect whether the destination application, in this example, an eBay application, has already been installed on the mobile device. If the destination application has been installed, it will fetch the data store for this superlink from the link server, and redirect this user from the browser application directly to the eBay mobile application with URL ebay://launch?itm=12345&discount=$50-off-ipad. Thus, the eBay application receives the data {"discount": "$50-off-ipad", "show-item-#":"12345"} from the deeplink parameters.

If the destination has not been installed on the mobile device, the link server will record this interactive or click event and all of the relevant data associated with this interaction (e.g., HTTP request header, IP address, user agent, cookies, etc.) into the event database (e.g., device/event database 113). Then, redirects the user to the destination URL configured in the link database 112 to download and install the application.

In one embodiment, the link server 104 will detect that via the HTTP request header (e.g., part of user agent string), then render an HTML page with a Java script to test on the browser to determine whether the device has the destination mobile application installed via eBay app's deeplink URL with data stored on link server 104 for this superlink appended: "ebay://yozio-data-passthrough/?discount=$50-off+ipad&show-item-#=12345". If the mobile web browser have not redirected within a preconfigured amount of time depending on the browser and detected device (e.g., 50 milliseconds to 500 milliseconds), the Java script rendered in the HTML page will redirect them to an application store, so that the eBay user (buyer/seller) can download and install the application at its mobile device.

The Java script is to redirect the mobile device to a deeplink with eBay's protocol. If that succeeds, then the eBay application will be brought to the foreground, and the data is passed to the eBay application via deeplink. The deeplink will open the eBay mobile application directly, and eBay mobile application will parse this data and display this item with discount. If this deeplink URL redirect failed, that means the eBay mobile application has not been installed, and the Java script will redirect eBay user to an application store. This eBay user then downloads and installs the application and launches the application. The application contacts link server 104, and link server 104 will match the request to the event database 113 to locate a click event that happened earlier, and find the superlink associated with this click event, then retrieve the data {"discount":"$50-off ipad", "show-item-#":"12345"} from link database 112, and return the data back to the superlink user.

As described above, in addition to handling installation of the destination mobile application, the link server can record and buffer the interactive event of the superlink because the eBay user (buyer/seller) clicked on the superlink. Since the superlink is hosted by the link server, if the eBay user is on the Web, he/she will be sent to link server first, and if the eBay user is on a mobile device, the click of the superlink link will cause the eBay user's mobile device to launch a mobile Web browser with the superlink as its destination, which will then contact the link server first, then the link server will collect all of the contextual information, and redirect user accordingly.

At a later time, when the downstream application (e.g., destination mobile application, in this example eBay mobile application) is installed and launched, the downstream application can request the link server to retrieve the data of the superlink intended to pass through. Upon receiving such request, link manager 110 of the link server will obtain the relevant data from the downstream application (e.g., HTTP request header, IP address, user agent, cookies, etc.) and device manager 111 uses that information to find in the event database 113 the last click event from this particular mobile device that is associated with this downstream application. Then, link manager 110 uses the click event to find the superlink in the link database 112, and retrieves the data (e.g., {"discount":"$50-off-ipad", "show-item-#": "12345"}) stored in a database entry associated with the superlink from the link database 112, and returns the data in a deeplink form to the downstream application. The downstream application can then use these data to provide a better user experience.

Figure 6:
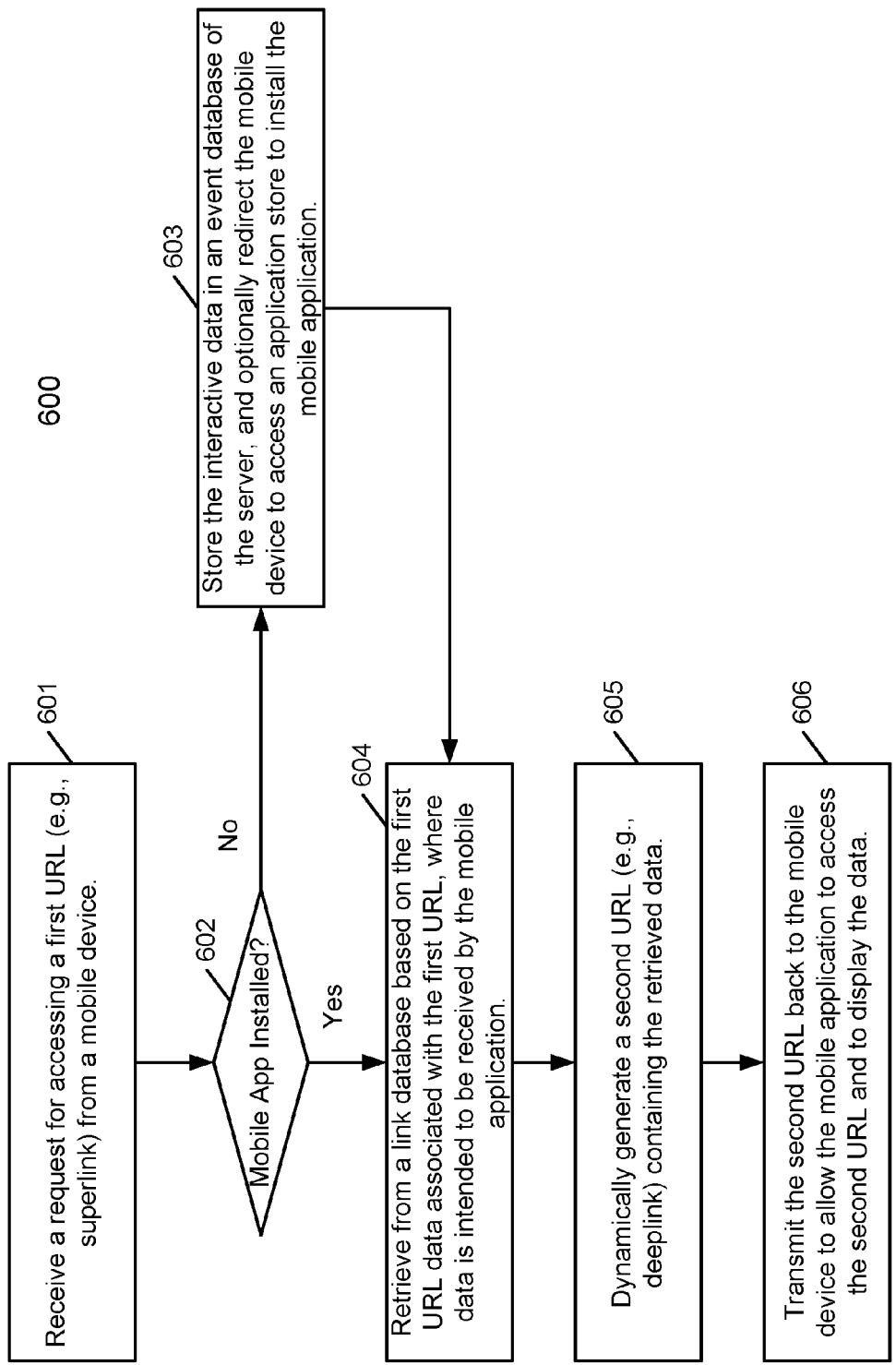
FIG. 6 is a flow diagram illustrating a method for exchanging information using superlinks according to one embodiment.

FIG. 6 is a flow diagram illustrating a method for exchanging information using superlinks according to one embodiment. Method 600 may be performed by processing logic which may include software, hardware, or a combination thereof. For example, method 600 may be performed by link manager 110 and/or device manager 111 of link server 104. Referring to FIG. 6, at block 601, processing logic receives a first URL link (e.g., superlink) from a mobile device. The first URL link is associated with a specific destination mobile application. At block 602, processing logic communicates with the mobile device to determine whether the destination mobile application has been installed and activated in the mobile device. If it is determined that the destination mobile application has not been installed at the mobile device, at block 603, the request is buffered in the link server, including extracting all the relevant information from the request and storing the information in a device and event database. The request is then redirect to a predetermined destination site or application store to allow the mobile device to install the destination mobile application. At block 604, processing logic looks up in the link database based on the received first URL link to retrieve first URL data associated with the first URL link. At block 605, processing logic dynamically generates a second URL link (e.g., deeplink) containing the retrieved first URL data. At block 606, the second URL link is then transmitted to the mobile device to allow the destination mobile application to access the data embedded within the second URL link.

With the link server, a superlink owner can access the link database to modify the data to be passed to a downstream application without having to modify the superlink. For example, a superlink owner can modify data 303 of FIG. 3 of a particular superlink, even after the superlink has been distributed to the clients. As a result, a next interaction of the corresponding superlink can retrieve the updated or different data. For example, if a user has generated a superlink with data {"promotion-item": "1234"}, then sent this superlink to 1000 customers via emails, expecting customers to buy item # 1234. However, the item was too popular and was sold out before the first 250 customers had a chance to click on the superlink and view the item inside the destination mobile application. Rather than displaying the sold out view inside the mobile application without getting customers to buy more products, this superlink user can change the promotion item to be 5678 by changing the original data {"promotion-item": "1234"} to {"promotion-item": "5678"} stored in the link database of the link server. Now, even though the superlink user cannot change the superlink URL inside the email inbox of the customers who have already received the emails, the superlink can now redirect customers to a different item, which is not yet sold out.

According to another aspect of the invention, a superlink user can take the advantage of this contextual awareness and set up rules or automated learning system to override or adjust the rules or data to be passed to the downstream application based on the context of each activity. A superlink allows its user to dynamically change/override the data being passed downstream application based on the click context and a set of rules and conditions. Therefore, each click on the link could result in very different downstream user experience in the destination application.

Figure 7A:
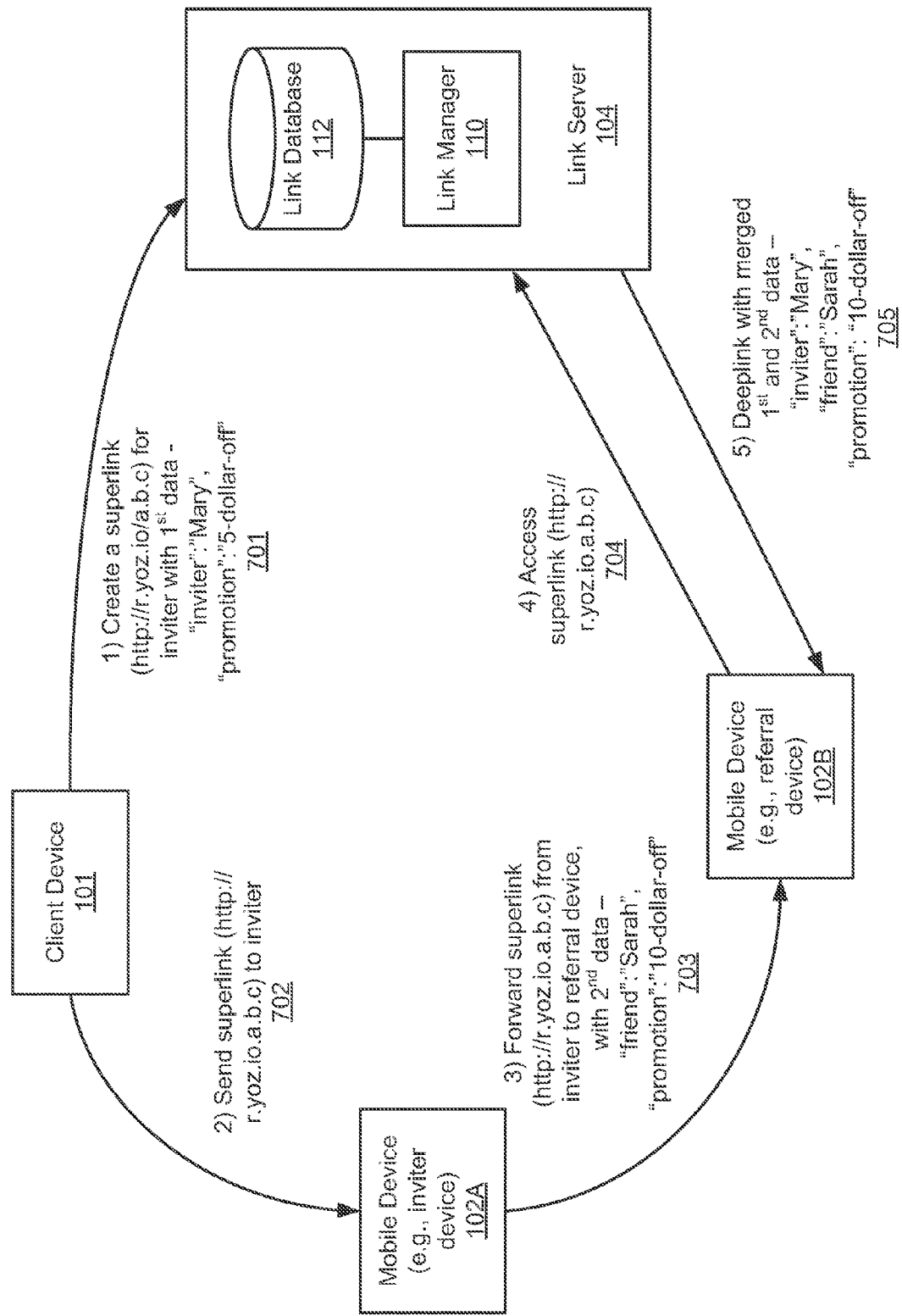
FIGS. 7A and 7B are block diagrams illustrating a superlink system according to certain embodiments of the invention.

FIG. 7A is a block diagram illustrating a superlink system according to another embodiment of the invention. Referring to FIG. 7A, link server 104 stores additional data from the link click and returns merged data to the downstream application. This configuration allows its user to append additional data in the form of URL parameters, and when the superlink is clicked, link sever 104 picks up these URL parameters, and saves them to a click event on the link server 104. At a later time, when the downstream application was opened, and requests link server 104 for these data, link server 104 will find the click event along with the data associated with the click Event, and merge them with the data stored in the superlink, and return the merged data to the downstream application. If the added data from click event has the same key as the existing data from superlink, the data from click event will override the data from superlink.

For example, referring to FIG. 7A, an eBay product team (represented by client 101) would like to use link server 104 for one of their users Mary represented by client 102A to invite her friends to try out the eBay mobile application. When a Mary's friend Sarah represented by client 102B clicks on this link, downloads and opens the eBay mobile application for the first time, eBay mobile application would like to display the first screen with a greeting from Many to Sarah. However, Mary has many friends, and it would be very inefficient to create a separate superlink for every single invitation.

With the data merging/overriding feature provided by link server 104, eBay product team 101 first creates a superlink http://r.yoz.io/a.b.cfor Mary 102A with data {"inviter": "Mary", "promotion": "5-dollar-off"}, which is stored in link database 112. While embedding this link in an email to send to Mary's close friend Sarah 102B, they can append friend=Sarah, promotion=10-dollar-off to the end of the URL—http://r.yoz.io/a.b.c?friend=Sarah&promotion=10-dollar-off. Note that the email may be sent from superlink owner 101 to Mary 102A (path 702) and then to Sarah 102B (path 703) or the email may be sent directly from superlink owner 101 to Sarah 102B.

When Sarah 102B clicks on this link from her email (path 704), link server 104 will receive this click, and store {"friend": "Sarah", "promotion": "10-dollar-off"} to the Click event, and redirect Sarah 102B to the eBay homepage (not shown), where Sarah can download the eBay mobile application. When Sarah opens the eBay mobile application for the first time, the eBay mobile application Sarah has installed on her device 102B will call link server 104, and ask for the data. Link server 104 will find the click event, which contains data {"friend": "Sarah", "promotion": "10-dollar-off"}, and then find the superlink from link database 112, which contains data {"inviter": "Mary", "promotion": "5-dollar-off"}, then merge the click event data into the superlink data, while overriding the superlink data if the data shares the same key, and pass the merged data back to the mobile application: {"inviter": "Mary", "promotion": "10-dollar-off", "friend": "Sarah"} via path 705. Now the eBay mobile application can display its first screen to Sarah that Mary invited her, and because she is a special friend, she got $10 discount.

According to another aspect of the invention, a superlink allows its user to integrate a third-party system or automated self learning systems to periodically change/override the rules via API, so the third-party system or the automated self learning systems can optimize the downstream application's user experience without user intervention. Similarly, a superlink allows its user to integrate third-party system or automated self learning systems, and makes all of the contextual information available to such system, and allows such system to dynamically change/override the data being passed to the downstream application for every click on the link in real time, which would improve the personalization efficiency even further.

Figure 7B:
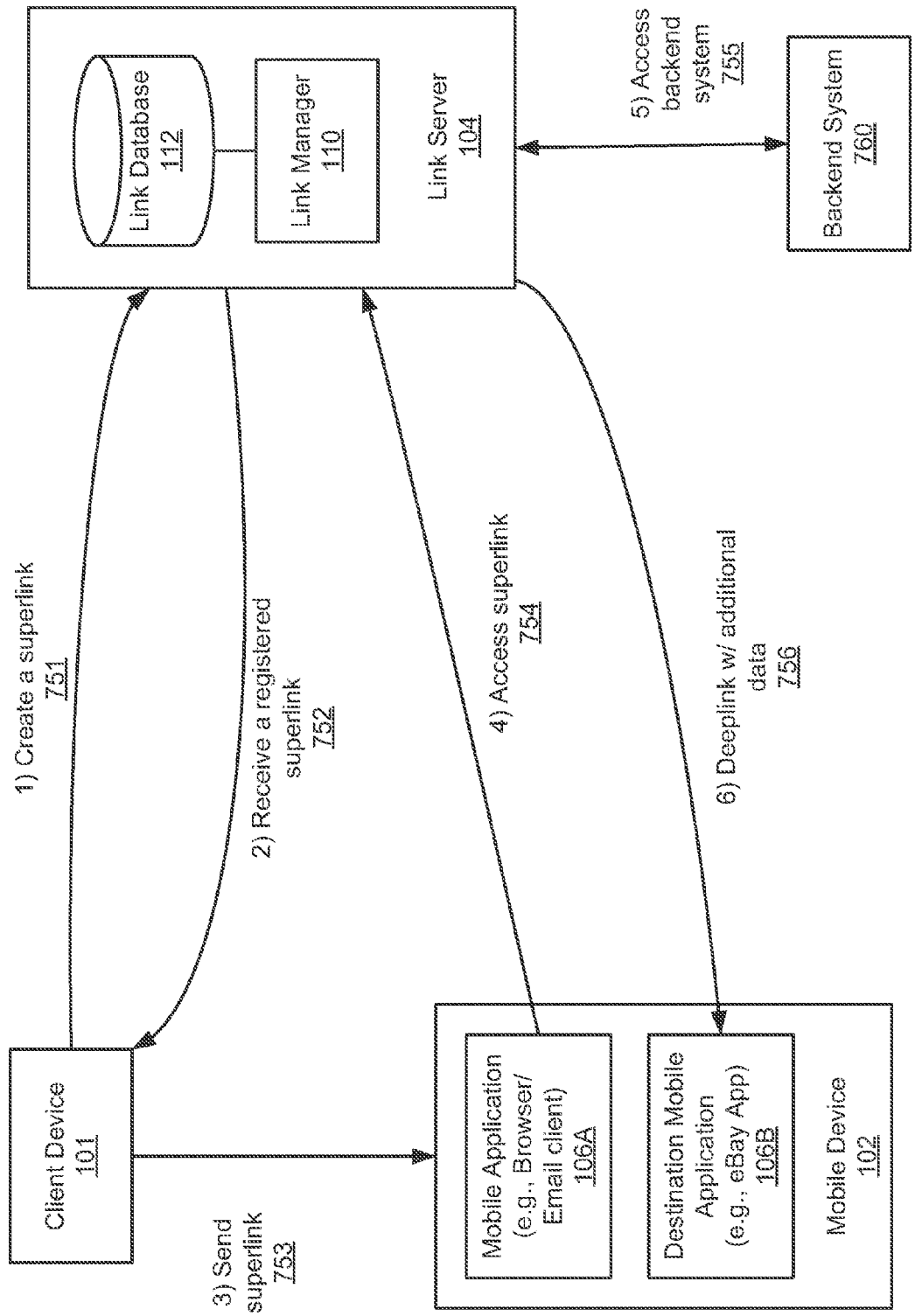

FIG. 7B is a block diagram illustrating a superlink system according to another embodiment of the invention. Referring to FIG. 7B, similar to the configuration as shown in FIG. 2, a superlink owner, client 101, can transmit a request via path 751 to link server 104 to create and receive a superlink from link server 104 via path 752. Link manager 110 of link server 104 generates a unique superlink and stores the mapping information between the superlink and the destination URL link, as well as the data (e.g., first data) intended to be passed via the destination URL link in link database 112. Subsequently, superlink owner 101 can send the superlink to another user, client 102, via path 753. The superlink can be sent via an email or other document. When a user of client 102 clicks on the superlink, it launches a browser application or other proprietary application 106A to access the superlink. The activation of the superlink cause the application 106A contact link server 104 via path 754. In response to the request for accessing the superlink, as described above, link manager 110 looks up in link database 112 to locate and identify the corresponding destination URL link and its associated data.

In addition, according to a further embodiment, link manager 110 may further access a backend or third-party system 760 via path 755 to determine any possible updated data that is more suitable for client 102 at the point in time. System 760 may be a backend system associated with the corresponding superlink owner 101 (e.g., eBay backend system) or alternatively, system 760 may be a third-party analytic system configured to analyze and determine the most appropriate data to be associated with client 102 based on a variety of information, such as, prior interactive history of client 102, relationship between client 102 and superlink owner 101, etc. The data retrieved from system 760 can then be used to replace or merge with the existing data registered in link database 112. The updated data and the destination URL link are then transmitted via path 756 to client 102.

Specifically, upon a click of a superlink, link manager 110 extracts a variety of information from the HTTP request header from the current activation of client 102 and prior activation information from link server 104 and/or system 760. The captured information may include user-agent, device type, device hardware, operating system, operating system version, system language, system locale, source application, source application version, time of the day, day of the week, IP address, internet network the end user resides in, if the user is connecting through a normal wireless or the current device's mobile carrier, geo location of this user, number of times the superlink has been clicked by the same device/user, if the destination application has been previously installed, timestamp of the previous clicks, all the devices that has clicked in the link, and the geographic relationship of those clicks and devices, etc.

A superlink owner can also specify additional contextual info in the form of data parameters. Such as gender, age, referring code, promotion code, friend info, etc. A superlink owner can take the advantage of this contextual awareness, and setup rules or automated learning system to override or adjust the rules or data to be passed to the downstream application based on the context of each click.

For example, a superlink owner has set the metadata "default-language" for all end users who clicks on this link to be "English", meaning if an end user clicks on this link, the subsequent page view or if they have downloaded the application, the application screen's default language will be in English. For the sake of the illustration, a user can be an eBay marketer/developer/growth manager, etc. An end user can be an eBay buyer/seller. However, an eBay seller could create a superlink that is associated with eBay mobile application, and send this superlink to an eBay buyer via the seller's news letter, so the buyer can buy from eBay directly. Or the eBay buyer could create the same superlink and share with other eBay buyers to collect referral reward/points, etc.

However, when an end user clicked on this superlink, the link server is able to detect that the end user's device is using Spanish as its primary language for its operating system (a context), the superlink owner can specify a rule on link server 104 to dynamically adjust/override the meta data "default-language" to be "Spanish", so this end user will see Spanish version of the content or application screens afterwards, and receive a much better experience.

As described above, link server 104 allows a third-party system 760 or automated self learning systems to periodically modify the rules which would then modify the data in scale. For example, if a third-party system or automated self learning system has detected that showing a puppy image to iOS users in United States would help increase the chance for the end user to purchase a product downstream, whether it is on the Web or in a mobile application, the third-party system or automated self learning system can add a new rule or modify the existing rules on the link server to adjust the metadata accordingly. Therefore, puppy related images can be displayed to iOS users in United States in the subsequent Web page views and/or in the mobile application, without affecting end users with different profiles/contexts.

In another example, when an end user clicks on a superlink, in that instant, before the superlink has taken/redirect the user to their destination, the link server will make all of the current set of context, metadata rules and metadata available to the third-party system, and the third-party system has found this end user is a Spanish speaker located in the US, has clicked on this link twice from email with an offer of $5 off guitar music sheets, and (their own information about this user) has previously purchased a music book in the past 12 days, and thus can make change to the metadata to change the subsequent Web page or application for this user, and adjust the language to Spanish, using US dollars as the currency, display the $5 off coupon, and add recommend relevant guitar related music items to this end user.

FIG. 8 is a flow diagram illustrating a method for exchanging information using superlinks according to another embodiment of the invention. Method 800 may be performed by processing logic which may include software, hardware, or a combination thereof. For example, method 800 may be performed by link manager 110 and/or device manager 111 of link server 104. Referring to FIG. 8, at block 801, processing logic registers a superlink from a first user (e.g., superlink owner or inviter) with first data (e.g., first discount) associated with the first user in a link database of a link server. At block 802, processing logic receives a request for accessing the registered superlink from a second user (e.g., referred user) with second data (e.g., second discount or referral discount) associated with the second user. At block 803, processing logic optionally accesses a third-party entity to obtain third data in view of the superlink and the first and second users. At block 804, processing logic generates a deeplink based on the superlink, where the deeplink includes merged first data, second data, and/or optional third data. At block 805, processing logic transmits the deeplink to the second user to allow a mobile application of the second user to display the merged data.

Currently an application store, such as Apple AppStore, does not allow parameter or data passing, and others such as Android App Stores have various degrees of support for data passing between the time when a user clicks on a mobile application download URL to when the user opens the application. No matching between a download URL click event and a mobile application installation event based on fingerprints is 100% accurate. This would sometimes lead to the mobile application making wrong decisions regarding what to do to the wrongly identified user. The simplest case would be the mobile application greets the new user with "Hi, John!" when, in fact, the user is someone else. One major reason why mobile application developers use fingerprints matching technologies is to enhance user onboarding experience through personalization. A mismatch of the user would defeat this goal, and even make the user experience worse.

According to one embodiment, a link server with a data storage (e.g., statistics database) and passing capability records the mobile application download URL click event, stores the data that need to be passed on servers, and when the user launches the application, attempts to find a matching previous click event and pass back the data stored on the servers to the mobile application. The matching is based on various clues, also referred to as fingerprints, including but not limited to the user's IP address.

In one embodiment, a link server with data storage and passing with probability is an extension to the technology described above. In addition to passing the stored data programmatically to a newly installed mobile application, the link server returns a probability estimate which indicates the likelihood of the match between 1) the user who just installed the mobile application, and 2) the user who clicked the SuperLink. Based on sophisticated statistical modeling on the backend (e.g., a backend data analytics server that collects and/or analyzes user activities, not shown), the link server would calculate a probability for each match between 1) a mobile application installation with 2) a mobile application download URL click, and return that probability number along with the associated data to the client's mobile application when it's launched, assuming a match is found.

With the matching accuracy probability number, a mobile application can now make a better decision on the level of personalization to show to the user. For example, when a user saw a dress on a mobile shopping site and decided to buy it in the mobile app, he/she clicks on a superlink to download the application from an application store. When he/she launches the shopping mobile application for the first time, the mobile application will send a request to a corresponding link server to find the last dress he/she was trying to buy on the mobile site. The link server will find the match between the new app install and the previous link click, and return not only the associated data (the dress information) but also the probability of the match accuracy back to the application. If the probability (e.g. 93%) is higher than a predetermined threshold set by the mobile provider or developer (e.g. 90%), the mobile application may decide to take a more personalized approach, such as "Hi Jane! Click here to buy the dress."; but if the probability is below the threshold (e.g. 65%), instead of showing a default app home screen, the application can still display a degraded personalized experience, such as "Hey there! Click here to browse our dress catalog". As a result of better first-time personalization experience, apps can achieve higher conversion rates, which would lead to higher app engagement and higher revenue generated from the application.

The probability number the link server returns can also be used in a number of other applications, including but not limited to, making decision on whether to attribute an application installation to a particular marketing channel. For example, if the matching click is from marketing channel X, the marketer may decide to count it and attribute it towards marketing channel X only if the probability (e.g. 93%) is higher than a certain threshold (e.g. 90%).

Figure 9:
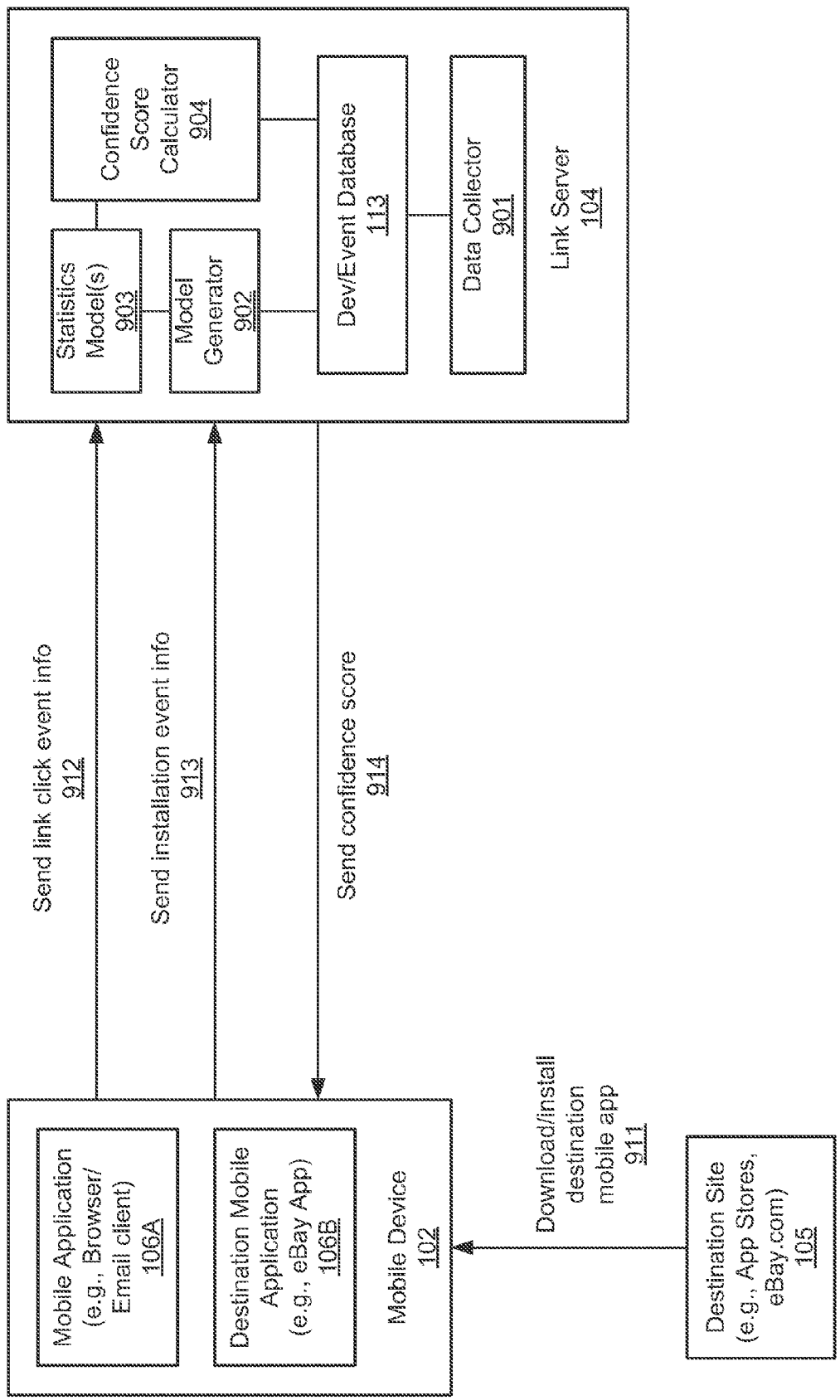
FIG. 9 is a block diagram illustrating a process of passing data using superlinks according to one embodiment of the invention.

FIG. 9 is a transactional diagram illustrating transactions between a client and a link server according to another embodiment of the invention. Referring to FIG. 9, similar to the transactions as shown in FIG. 4, a superlink owner as a client (e.g., client 101 of FIG. 4, not shown), can access link server 104 to request a superlink to be created by providing the necessary information such as destination URL and associated data to be passed. In response to a superlink from link server 104, the superlink owner can subsequently send the superlink to another user, client 102. When a user of client 102 clicks on the received superlink, the superlink causes mobile application 106A (e.g., browser application) as a source application to access the superlink, which in turn may redirect application 106A to access a predetermined destination site 105 (e.g., App store, eBay site).

From site 105, application 106A can download and install a destination mobile application 106B via path 911. Meanwhile, the activation of the superlink also sends a first event, e.g., a link click event to link server via path 912. The link click event may include identifying information about mobile device 102, such as, for example, non-unique fingerprints. The link click event and the identifying information may be collected by data collector 901 and stored in device/event database 113. The identifying information of mobile device 102 may include an IP address and/or MAC address associated with mobile device 102, a mobile application identifier, a type of operating system running within mobile device 102, a version number of the operating system, username, SIM card information (e.g., ISMI number), some hardware identifiers (e.g., processor, serial number), cookies, or a combination of any one or more of these information.

The identifying information may further include the HTTP request header from the current interaction of the superlink. The identifying information may include user-agent, system language, system locale, source app, source application version, time of the day, day of the week, the network segment in which the end user resides, if the user is connecting through a normal wireless or the current device's mobile carrier, geographical location of this user, number of times the superlink has been activated by the same device and/or user, if the destination application been previously installed, timestamp of the previous clicks, all the devices that has clicked in the link, and the geographic relationship of those clicks and devices, etc. A superlink owner can also specify additional contextual info in the form of data parameters, such as gender, age, referring code, promotion code, friend info, etc. These data items can be used as fingerprints to match with other data received some other time to ascertain whether two users are the same user.

Referring back to FIG. 9, once mobile application 106B has been installed at mobile device 102, mobile application 106B sends a second event, e.g., an installation event (or operating data or status) to link server 104 via path 913. The installation event may also include some or all of the identifying information as described above with respect to the click event. Such event information may also be stored in event database 103. In response to the installation event, confidence score calculator 904 performs an analysis on the received installation event in view of the prior events received and stored in event database 103 to determine or calculate a confidence score. In one embodiment, confidence score calculator 904 may utilize one or more statistics models 903 to determine the confidence score. A confidence score represents a likelihood that a first user who sends a first event (e.g., link click event) is the same user as a second user who sends a second event (e.g., installation event). In one embodiment, the confidence score may be in a form of a probability number (e.g., percentage number) representing a probability that the first user is the same user as the second user.

In one embodiment, data collector 901 periodically collects user interactive data such as click events, and stores the user interactive data in event database 103, as part of history of user actions or user behaviors over a period of time. Model generator 902 periodically analyzes the data stored in database 103 and generates statistics models 903. Model generator 902 may be implemented as part of an expert system that periodically update or train models 903 based on the data stored in database 113, which may be periodically received on an ongoing basis.

According to some embodiments, various statistical models can be used to calculate the final confidence score, including a first model to determine the probability of the time gaps between the first event (e.g., a click event) and the second event (e.g., an installation event) and a second model to determine how much variability (entropy) there is for a particular IP address, mobile app, hardware, operating system, operating system version. The less variability there is for any one of these attributes, the more certainty (higher probability) the final matching result is. Data collector 901 also records every match with the corresponding probability between a cookie (on the click event side) and a device identifier (on the mobile installation side). As a result, in the future confidence score calculator can improve previous confidence scores as users install more superlink-enabled mobile applications.

For example, when a user installs a first mobile application, confidence score calculator 904 returns a match with a confidence score of 90%. Next time the same user installs a second mobile application and if the matching result is the same as last time, the system can build on top of the previous 90% and be even more certain this time. As a result, confidence score calculator 904 can return something such as 99%. Finally, the confidence score depends on how many potential matches the system finds: the less potential matches, the more we are sure about the final result. The confidence score is then transmitted back to mobile device 102 via path 914, which may be utilized by mobile application 106B to provide customized or personalized services to the user.

Figure 10:
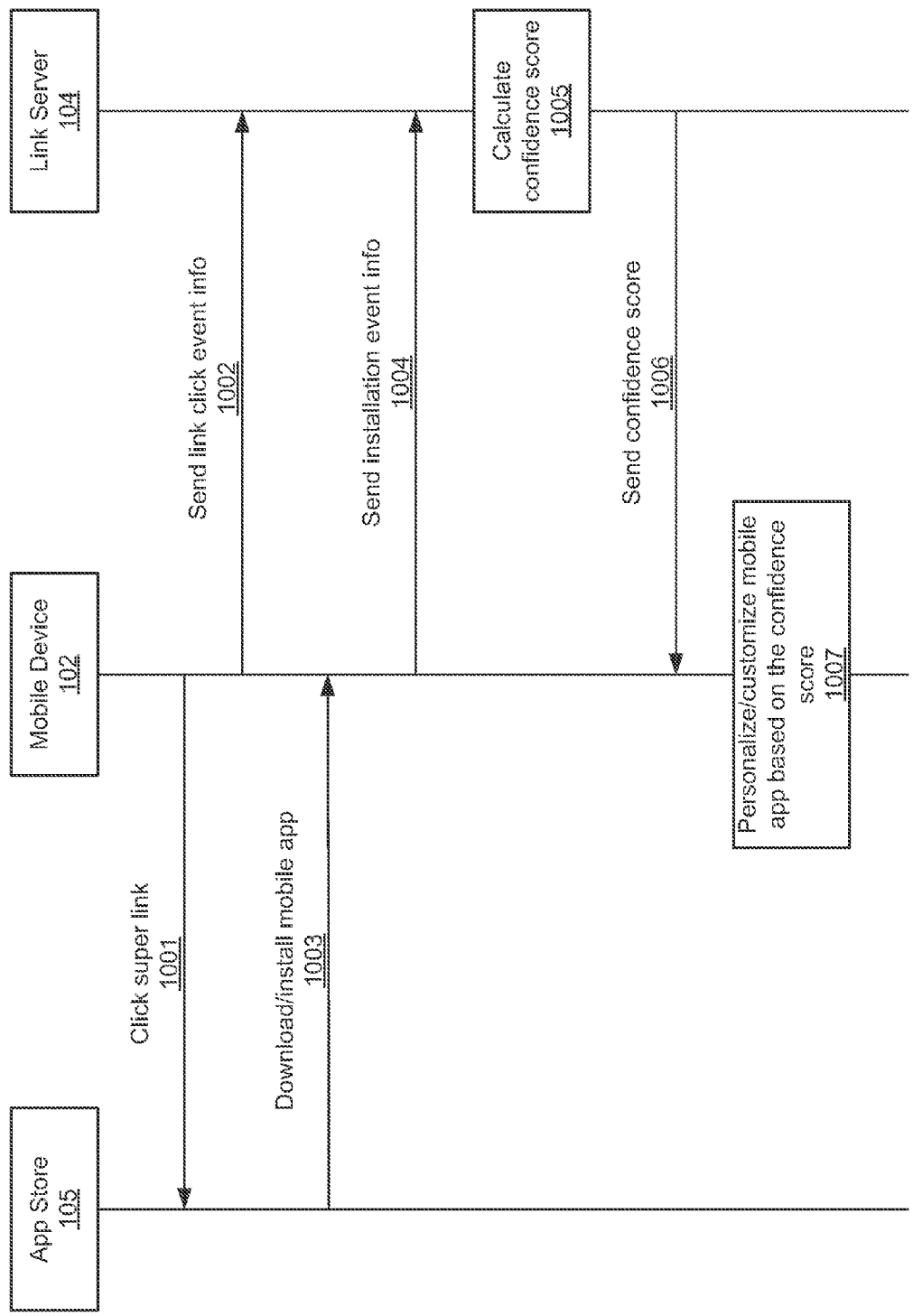
FIG. 10 is a block diagram illustrating a process of passing data using superlinks with probability according to another embodiment of the invention.

FIG. 10 is a transactional diagram illustrating transactions between a client and a link server according to another embodiment of the invention. Referring to FIG. 10, a user of mobile device 102 clicks on a superlink, which in turn redirects a mobile application (e.g., browser) to access App store 105 via path 1001. Meanwhile a link click event is sent from mobile device 102 to link server 104 via path 1002. The link click event may include the identifying information as described above, which may be stored in a database of link server 104. Mobile device 102 downloads a superlink enabled mobile application from App store 105 via path 1003 and installs the mobile application within mobile device 102. Once the mobile application has been installed, the mobile application sends an installation event to link server 104 via path 1004. The installation event may also include the identifying information as described above to be stored in a database of link server 104. In response to the installation event, at transaction 1005, a confidence score is determined or calculated by link server 104, for example, using one or more statistics models. The confidence score is then returned back to mobile device 102 via path 1006. The confidence score is utilized by mobile device to customize or personalize the mobile application at transaction 1007.

In one embodiment, the mobile application of mobile device 102 includes a manager or user interface customizer to determine the level of personalization based on the receive confidence score level. If the confidence score is high, for example, around 99%, the manager may decide to deliver a very personalized message. If the confidence score is around 70%+, the manager may deliver a somewhat personal message; and if the confidence score is below 70%, it may just use a generic message. As a result, users would not be confused when a mismatch occurs.

According to another embodiment, the confidence score is more than 99%, the system could allow the mobile application (e.g., eBay mobile App) to automatically log the user into the mobile application when this user clicks on a super link from an email or on a mobile Website associated with the mobile application, regardless of whether this user has installed that mobile application previously. According to a further embodiment, if the confidence score is more than 70%, and we know that this user expressed his interest on an item such as a pair of Nike® shoes before this user open the mobile application for the first time, the mobile application could use this information to recommend user about the same item on top of the screen when this user opens this mobile application for the first time. In another embodiment, if a user browsed several movies on a movie provider (e.g., Netflix®) website before the user downloaded a corresponding mobile application, the movie provider could store these browsing activities as part of prior browsing history, and use a super link to pass these activity data to a mobile application when the user installs and opens the mobile application on its mobile device. As a result, when the user opens the mobile application for the first time, the movie provider could allow the user to navigate back and forth on its mobile application.

Figure 11:
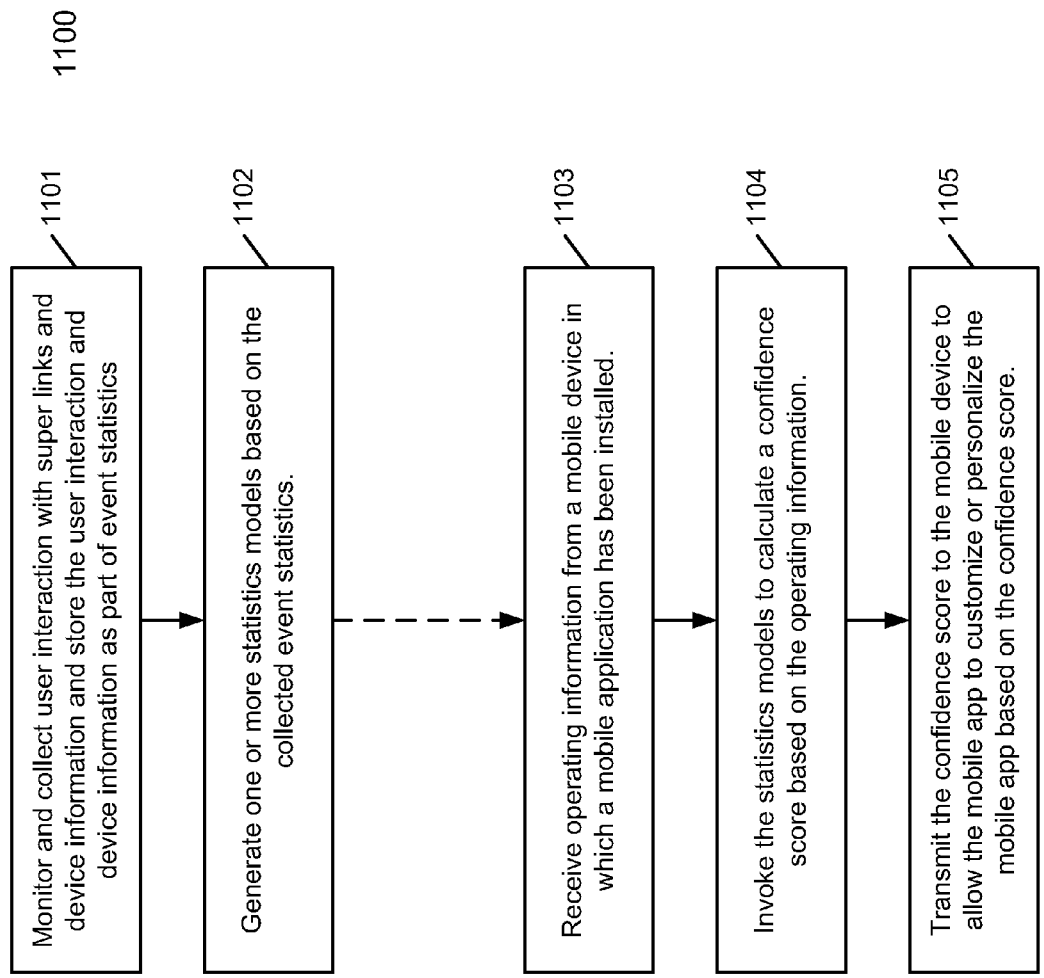
FIG. 11 is a flow diagram illustrating a process for exchanging information using superlinks according to another embodiment of the invention.

FIG. 11 is a flow diagram illustrating a process for exchanging information using superlinks according to another embodiment of the invention. Process 1100 may be performed by processing logic which may include hardware, software, or a combination thereof. For example, process 1100 may be performed by link server 104. Referring to FIG. 11, at block 1101, processing logic monitors and collects periodically user interaction with superlinks and identifying information of mobile devices and/or users, and stores the collected information in a database maintained by a persistent storage device associated with or accessible by a link server. At block 1102, processing logic generates one or more statistics models based on the collected data. Subsequently at block 1103, processing logic receives operating information from a mobile device in which a mobile application has been installed and operating. At block 1104, processing logic invokes the statistics models to determine or calculate a confidence score based on the received operating information. The confidence score represents a likelihood that the user who clicked on a superlink is the same user who installs the mobile application that was triggered from the activation of the superlink. At block 1105, the confidence score is then transmitted to the mobile device to allow the mobile application to customize or personalize the mobile application for the user based on the confidence score.

Figure 12:
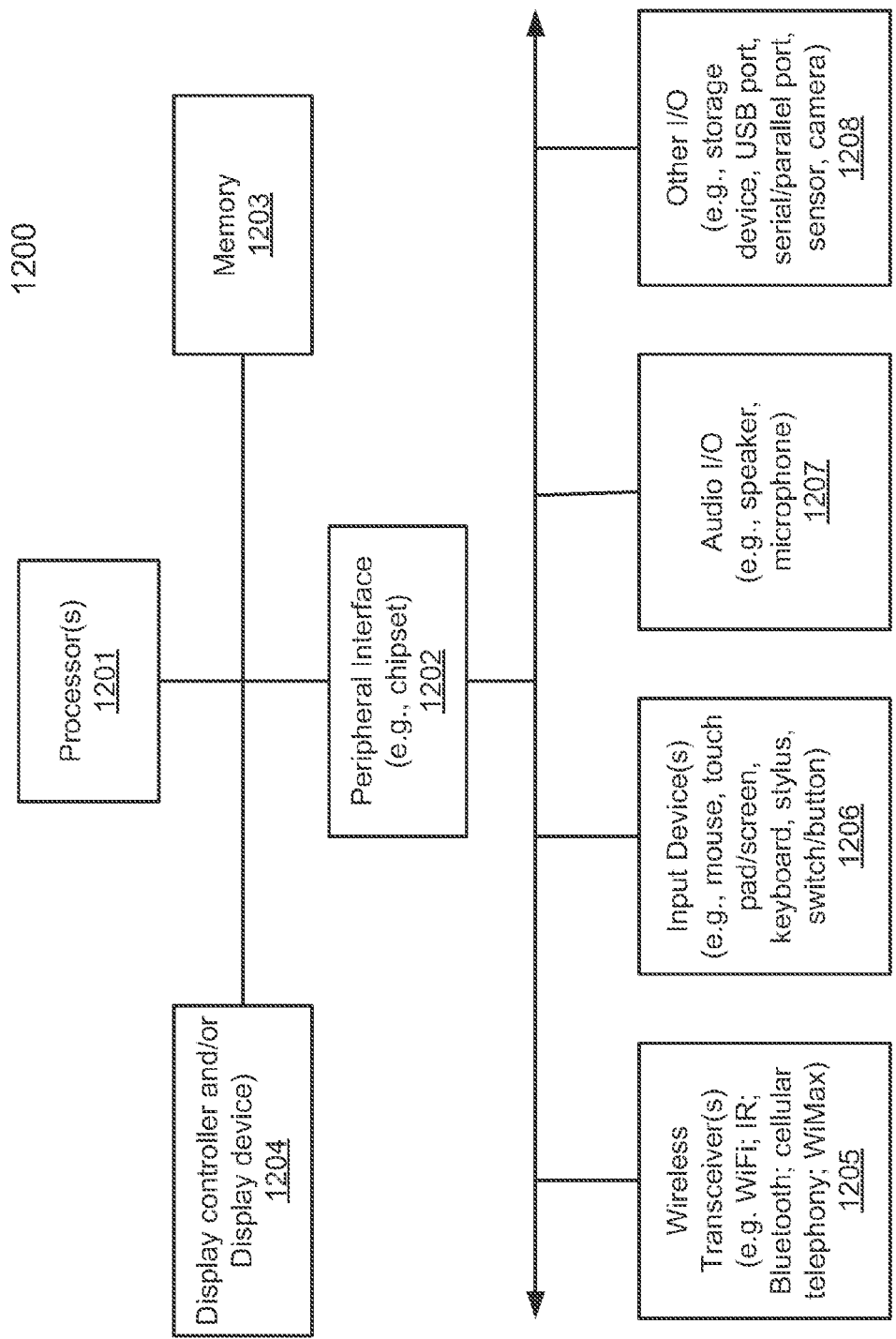
FIG. 12 is a block diagram illustrating an example of a data processing system which may be used with one embodiment of the invention.

FIG. 12 is a block diagram illustrating an example of a data processing system which may be used with one embodiment of the invention. For example, system 1200 may represents any of data processing systems described above performing any of the processes or methods described above. System 1200 may represent a desktop (e.g., iMac™ available from Apple Inc. of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a personal communicator, a gaming device, a network router or hub, a wireless access point (AP) or repeater, a set-top box, or a combination thereof. For example, system 1200 may represent clients 101-102 and/or server 104 of FIG. 1.

Referring to FIG. 12, in one embodiment, system 1200 includes processor 1201 and peripheral interface 1202, also referred to herein as a chipset, to couple various components to processor 1201 including memory 1203 and devices 1205-1208 via a bus or an interconnect. Processor 1201 may represent a single processor or multiple processors with a single processor core or multiple processor cores included therein. Processor 1201 may represent one or more general-purpose processors such as a microprocessor, a central processing unit (CPU), or the like. More particularly, processor 1201 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1201 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 1201 is configured to execute instructions for performing the operations and steps discussed herein.

Peripheral interface 1202 may include memory control hub (MCH) and input output control hub (ICH). Peripheral interface 1202 may include a memory controller (not shown) that communicates with a memory 1203. Peripheral interface 1202 may also include a graphics interface that communicates with graphics subsystem 1204, which may include a display controller and/or a display device. Peripheral interface 1202 may communicate with graphics device 1204 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 1201. In such a configuration, peripheral interface 1202 operates as an interface chip performing some functions of the MCH and ICH. Furthermore, a graphics accelerator may be integrated within the MCH or processor 1201.

Memory 1203 may include one or more volatile storage (or memory) devices such as random access memory (RAM), dynamic RAM (DRAM), synchronous DRAM (SDRAM), static RAM (SRAM), or other types of storage devices. Memory 1203 may store information including sequences of instructions that are executed by processor 1201, or any other device. For example, executable code and/or data of a variety of operating systems, device drivers, firmware (e.g., input output basic system or BIOS), and/or applications can be loaded in memory 1203 and executed by processor 1201. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 1202 may provide an interface to IO devices such as devices 1205-1208, including wireless transceiver(s) 1205, input device(s) 1206, audio IO device(s) 1207, and other IO devices 1208. Wireless transceiver 1205 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 1206 may include a mouse, a touch pad, a touch sensitive screen (which may be integrated with display device 1204), a pointer device such as a stylus, and/or a keyboard (e.g., physical keyboard or a virtual keyboard displayed as part of a touch sensitive screen). For example, input device 1206 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 1207 may include a speaker and/or a microphone to facilitate voice-enabled functions, such as voice recognition, voice replication, digital recording, and/or telephony functions. Other optional devices 1208 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 1208 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 12 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for retrieving content to be presented at mobile devices, the method comprising:
creating a first universal resource locator (URL) link and storing the first URL link in a link database of a server, including
receiving a third URL link and first data from a second device of a second user, the third URL specifically tailored a first mobile application,
generating the first URL link that uniquely represents a second URL link,
storing the third URL link and the first data in a database entry of the link database corresponding to the first URL link, and
transmitting the first URL link to the second device, wherein the first URL link is shorter than the third URL link without the first data embedded therein;
receiving at the server the first URL link from a first mobile device of a first user;
in response to the first URL link, determining whether the first mobile application that is associated with the first URL link has been installed at the first mobile device;
if the first mobile application has been installed at the first mobile device,
retrieving the first data that is associated with the first URL link from the link database,
generating the second URL link specifically for the first mobile device, the second URL link including the first data embedded therein, and
transmitting the second URL link to the first mobile device to allow the first mobile application to access the second URL link and display the first data on a display of the first mobile device; and
if the first mobile application has not been installed at the first mobile device,
collecting interactive data of the first user with respect to the first URL link,
storing the interactive data in an event database of the server,
redirecting the first mobile device to a fourth URL link representing an application store to allow the first mobile device to download and install the first mobile application at the first mobile device,
receiving a signal from the first mobile application installed at the first mobile device indicating that the first mobile application has been installed at the first mobile device,
generating the second URL link specifically for the first mobile device, the second URL link including the first data associated embedded therein, and
transmitting the second URL link to the first mobile device to allow the installed first mobile application access the second URL link.

2. The method of claim 1, wherein the fourth URL was received from the second user and stored in the database entry associated with the first URL link when the first URL link was created.

3. The method of claim 1, wherein the interactive data stored in the event database comprises a first Internet protocol (IP) address of the first mobile device associated with the first mobile device and first hypertext transport protocol (HTTP) header information of interacting the first URL link from the first mobile device.

4. The method of claim 3, further comprising:
in response to the signal received from the first mobile device, extracting a second IP address and second HTTP header information from the signal; and
performing a lookup operation in the event database to identify the second URL link by matching the first IP address with the second IP address, and comparing HTTP header information of the first and second HTTP header information.

5. The method of claim 4, further comprising:
prior to transmitting the second URL link to the first mobile device, extracting second data from the first URL link received from the first mobile device, wherein the second data is different than the first data;
merging the first data and the second data to form third data, wherein the third data is different than the first and second data;
embedding the third data in the second URL link to allow the first mobile application to display the third data when accessing the second URL link.

6. The method of claim 4, further comprising:
collecting from the first mobile device user information of the first user and device information of the first mobile device;
transmitting a request to a backend system to perform an analysis on first URL link in view of the user information of the first user and the device information of the first mobile device; and
in response to fourth data received from the backend system based on the analysis, incorporating the fourth data into the second URL link to allow the first mobile application to display the fourth data when accessing the second URL link.

7. The method of claim 4, further comprising:
examining a set of one or more rules associated with the first URL link, wherein the one or more rules have been previously configured by a third user via a configuration interface of the server;
modifying the first data based on the examination of the one or more rules; and
integrating the modified first data with the second URL link prior to transmitting the second URL link to the first mobile device.

8. A non-transitory machine-readable medium having instructions stored therein, which when executed by a processor, cause the processor to perform operations of retrieving content to be presented at mobile devices, the operations comprising:
creating a first universal resource locator (URL) link and storing the first URL link in a link database of a server, including
receiving a third URL link and first data from a second device of a second user, the third URL specifically tailored a first mobile application,
generating the first URL link that uniquely represents a second URL link,
storing the third URL link and the first data in a database entry of the link database corresponding to the first URL link, and
transmitting the first URL link to the second device, wherein the first URL link is shorter than the third URL link without the first data embedded therein;
receiving at the server the first URL link from a first mobile device of a first user;
in response to the first URL link, determining whether the first mobile application that is associated with the first URL link has been installed at the first mobile device;
if the first mobile application has been installed at the first mobile device,
retrieving the first data that is associated with the first URL link from the link database,
generating the second URL link specifically for the first mobile device, the second URL link including the first data embedded therein, and
transmitting the second URL link to the first mobile device to allow the first mobile application to access the second URL link and display the first data on a display of the first mobile device; and
if the first mobile application has not been installed at the first mobile device,
collecting interactive data of the first user with respect to the first URL link,
storing the interactive data in an event database of the server,
redirecting the first mobile device to a fourth URL link representing an application store to allow the first mobile device to download and install the first mobile application at the first mobile device,
receiving a signal from the first mobile application installed at the first mobile device indicating that the first mobile application has been installed at the first mobile device,
generating the second URL link specifically for the first mobile device, the second URL link including the first data embedded therein, and
transmitting the second URL link to the first mobile device to allow the installed first mobile application access the second URL link.

9. The non-transitory machine-readable medium of claim 8, wherein the fourth URL was received from the second user and stored in the database entry associated with the first URL link when the first URL link was created.

10. The non-transitory machine-readable medium of claim 8, wherein the interactive data stored in the event database comprises a first Internet protocol (IP) address of the first mobile device associated with the first mobile device and first hypertext transport protocol (HTTP) header information of interacting the first URL link from the first mobile device.

11. The non-transitory machine-readable medium of claim 10, wherein the operations further comprise:
in response to the signal received from the first mobile device, extracting a second IP address and second HTTP header information from the signal; and
performing a lookup operation in the event database to identify the second URL link by matching the first IP address with the second IP address, and comparing HTTP header information of the first and second HTTP header information.

12. The non-transitory machine-readable medium of claim 11, wherein the operations further comprise:
prior to transmitting the second URL link to the first mobile device, extracting second data from the first URL link received from the first mobile device, wherein the second data is different than the first data;

merging the first data and the second data to form third data, wherein the third data is different than the first and second data;

embedding the third data in the second URL link to allow the first mobile application to display the third data when accessing the second URL link.

13. The non-transitory machine-readable medium of claim 11, wherein the operations further comprise:

collecting from the first mobile device user information of the first user and device information of the first mobile device;

transmitting a request to a backend system to perform an analysis on first URL link in view of the user information of the first user and the device information of the first mobile device; and in response to fourth data received from the backend system based on the analysis, incorporating the fourth data into the second URL link to allow the first mobile application to display the fourth data when accessing the second URL link.

14. The non-transitory machine-readable medium of claim 11, wherein the operations further comprise:

examining a set of one or more rules associated with the first URL link, wherein the one or more rules have been previously configured by a third user via a configuration interface of the server;

modifying the first data based on the examination of the one or more rules; and integrating the modified first data with the second URL link prior to transmitting the second URL link to the first mobile device.

15. A data processing system, comprising:

a processor; and a memory coupled to the processor for storing instructions, which when executed from the memory, cause the processor to perform operations of retrieving content to be presented at mobile devices, the operations including creating a first universal resource locator (URL) link and storing the first URL link in a link database, including receiving a third URL link and a first data from a second device of a second user, the third URL specifically tailored to a first mobile application, generating the first URL link that uniquely represents a second URL link, storing the third URL link and the first data in a database entry of the link database corresponding to the first URL link, and transmitting the first URL link to the second device, wherein the first URL link is shorter than the third URL link without the first data embedded therein, receiving the first URL link from a first mobile device of a first user, in response to the first URL link, determining whether the first mobile application that is associated with the first URL link has been installed at the first mobile device, if the first mobile application has been installed at the first mobile device, retrieving first data that is associated with the first URL link from the link database, generating the second URL link specifically for the first mobile device, the second URL link including the first data embedded therein, and transmitting the second URL link to the first mobile device to allow the first mobile application to access the second URL link and display the first data on a display of the first mobile device, and if the first mobile application has not been installed at the first mobile device, collecting interactive data of the first user with respect to the first URL link, storing the interactive data in an event database of the server, redirecting the first mobile device to a fourth URL link representing an application store to allow the first mobile device to download and install the first mobile application at the first mobile device, receiving a signal from the first mobile application installed at the first mobile device indicating that the first mobile application has been installed at the first mobile device, generating the second URL link specifically for the first mobile device, the second URL link including the first data associated with the first URL link embedded therein, and transmitting the second URL link to the first mobile device to allow the installed first mobile application access the second URL link.

16. The system of claim 15, wherein the fourth URL was received from the second user and stored in the database entry associated with the first URL link when the first URL link was created.

17. The system of claim 15, wherein the interactive data stored in the event database comprises a first Internet protocol (IP) address of the first mobile device associated with the first mobile device and first hypertext transport protocol (HTTP) header information of interacting the first URL link from the first mobile device.

18. The system of claim 17, wherein the operations further comprise:

in response to the signal received from the first mobile device, extracting a second IP address and second HTTP header information from the signal; and performing a lookup operation in the event database to identify the second URL link by matching the first IP address with the second IP address, and comparing HTTP header information of the first and second HTTP header information.

19. The system of claim 18, wherein the operations further comprise:

prior to transmitting the second URL link to the first mobile device, extracting second data from the first URL link received from the first mobile device, wherein the second data is different than the first data;

merging the first data and the second data to form third data, wherein the third data is different than the first and second data;

embedding the third data in the second URL link to allow the first mobile application to display the third data when accessing the second URL link.

* * * * *